US011877630B2

(12) United States Patent
Shah

(10) Patent No.: US 11,877,630 B2
(45) Date of Patent: Jan. 23, 2024

(54) FOUR-STONE SEAMLESS CUSHION CUT DIAMOND AND METHOD FOR MAKING THE SAME

(71) Applicant: Saneal Shah, Mumbai (IN)

(72) Inventor: Saneal Shah, Mumbai (IN)

( * ) Notice: Subject to any disclaimer, the term of this patent is extended or adjusted under 35 U.S.C. 154(b) by 0 days.

(21) Appl. No.: 17/973,224

(22) Filed: Oct. 25, 2022

(65) Prior Publication Data

US 2023/0068790 A1 Mar. 2, 2023

Related U.S. Application Data

(62) Division of application No. 16/521,938, filed on Jul. 25, 2019, now Pat. No. 11,517,083.

(51) Int. Cl.
*A44C 17/00* (2006.01)
*B28D 5/00* (2006.01)

(52) U.S. Cl.
CPC .............. *A44C 17/001* (2013.01); *B28D 5/00* (2013.01)

(58) Field of Classification Search
CPC ........ A44C 17/001; A44C 17/002; B28D 5/00
USPC .............................. 125/30, 1; 63/32; D11/90
See application file for complete search history.

(56) References Cited

U.S. PATENT DOCUMENTS 2,340,659 A * 2/1944 Goldstein ............ A44C 17/001 D11/90
3,875,760 A * 4/1975 Jones ................... A44C 17/001 63/32
4,708,001 A * 11/1987 Alburger .............. A44C 17/001 D11/90
8,813,519 B2 * 8/2014 Rydlewicz ........... A44C 17/001 D11/89
10,362,843 B2 * 7/2019 Strnad, II ............. A44C 17/001
2004/0055333 A1 * 3/2004 Smith .................. A44C 17/001 63/32
2010/0319399 A1 * 12/2010 Mandell ............... A44C 17/002 63/28
2013/0019636 A1 * 1/2013 Rydlewicz ........... A44C 17/001 451/41
2019/0274399 A1 * 9/2019 Tomasik ................ A44C 17/00

* cited by examiner

*Primary Examiner* — Ghassem Alie
(74) *Attorney, Agent, or Firm* — Cha & Reiter, LLC; Mirut Dalal; Steve Cha

(57) ABSTRACT

Presented herein is a diamond comprising a table, a crown, a girdle, a pavilion, and a culet. The table is rectangular, having a length and a width. The table includes a first side, adjacent to a second side, adjacent to a third side, and adjacent to a fourth side. The first side of the table is directly connected with a first facet of the girdle. The second side of the table is directly connected with a second facet of the girdle. The crown includes a plurality of facets connecting the third side and the fourth side of the table to the girdle. The pavilion is connected to the girdle. The culet is positioned directly below a point having a 1% deviation from the center of the girdle.

3 Claims, 11 Drawing Sheets

600

600

FOUR-STONE SEAMLESS CUSHION CUT DIAMOND AND METHOD FOR MAKING THE SAME

CROSS REFERENCE

This application is a Divisional Application of "FOUR-STONE SEAMLESS CUSHION CUT DIAMOND AND METHOD FOR MAKING THE SAME," U.S. patent Ser. No. 16/521,938, filed Jul. 25, 2019, which is a divisional application of U.S. patent application Ser. No. 15/383,282 filed Dec. 19, 2016, both of which are incorporated by reference for all purposes.

This Application is related to the following applications filed by the same inventor, contemporaneously with the '282 application, each of which are incorporated herein by reference:

| Docket No. | Filing Date | Serial | Title |
|---|---|---|---|
| 90-1-002 | Dec. 19, 2016 | 15/383,485 U.S. Pat. No. 10,244,833 | FOUR-STONE SEAMLESS RADIANT CUT DIAMOND AND METHOD FOR MAKING THE SAME |
| 90-1-002DIV | Mar. 6, 2019 | 16/245,412 | FOUR-STONE SEAMLESS RADIANT CUT DIAMOND AND METHOD FOR MAKING THE SAME |
| 90-4-001 | Dec. 19, 2016 | 29/588,224 D812,513 | ORNAMENTAL DESIGN OF GEMSTONE JEWELRY |
| 90-4-002 | Dec. 19, 2016 | 29/588,234 D812,514 | ORNAMENTAL DESIGN OF GEMSTONE JEWELRY |
| 90-4-003 | Dec. 19, 2016 | 29/588,241 D812,515 | ORNAMENTAL DESIGN OF GEMSTONE JEWELRY |
| 90-4-004 | Dec. 19, 2016 | 29/588,243 D812,516 | ORNAMENTAL DESIGN OF GEMSTONE JEWELRY BACKGROUND |

Diamonds are some of the most cherished and expensive jewelry. For example, diamonds are practically a staple of any engagement or wedding. Larger diamonds are more spectacular and pleasing to customers.

However, larger diamonds are quite expensive. The prices of diamonds are not linear with respect to size. For example, a larger diamond that is twice as large as a smaller diamond is very likely to be worth more than twice as much as the smaller diamond. Therefore, there is a desire to reduce this expense.

Further limitations and disadvantages of conventional and traditional approaches will become apparent to one of skill in the art, through comparison of such systems with embodiments of the present invention as set forth in the remainder of the present application with reference to the drawings.

SUMMARY

According to one aspect of the present application, there is presented a diamond. The diamond comprises a table, a crown, a girdle, and pavilion, and a culet. The table is rectangular, having a length and a width. The table comprises a first side, adjacent to a second side, adjacent to a third side, and adjacent to a fourth side. The first side of the table is directly connected with a first facet of the girdle. The second side of the table is directly connected with a second facet of the girdle. The crown comprises a plurality of facets connecting the third side and the fourth side of the table to the girdle. The pavilion is connected to the girdle. The culet is positioned directly below a point having a 1% deviation from the center of the girdle.

According to another aspect of the present application, there is presented a method of cutting a diamond from a princess cut diamond. The princess cut diamond comprises a table, a crown disposed below the table, and a girdle disposed beneath the crown. The girdle comprises four facets forming a substantially rectangular shape. The four facets comprise a first facet, a second facet substantially perpendicular to the first facet, a third facet substantially perpendicular to the second facet, and a fourth facet substantially perpendicular to the third facet and substantially perpendicular to the first facet. The princess cut diamond further comprises a pavilion disposed below the girdle, and a culet directly below a point substantially at the center of the girdle. The method comprises making a cut parallel to the first facet of the girdle, proceeding from the second facet to the fourth facet, thereby: removing a portion of the crown and pavilion, shortening the second facet and the fourth facet, and resulting in a new girdle facet, wherein the new girdle facet is directly connected to the table. The method further comprises making a cut parallel to the shortened second facet, proceeding from the first facet to the new girdle facet, thereby removing another portion of the crown and the pavilion, shortening the first facet, shortening the new girdle facet to a first measurement, resulting in another new girdle facet having a second measurement, wherein the another new girdle facet is directly connected to the table, and perpendicular shortened new girdle facet, and wherein the shortened new girdle facet and the new girdle facet meet at a first point. The method further comprises cutting the pavilion such that the culet is directly under a second point that is within 1% deviation of half the first measurement from the first point and half the second measurement from the first point.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION

The following description describes certain embodiments. The following discussion shall be understood to be only for the purpose of enabling a person of ordinary skill in the art to make and use the subject matter of any claims that are presently pending or may later be added, or which may issue in any patent. It shall be understood that the following embodiments are not limiting and nothing is essential or critical unless specifically designated.

As the following discussion is presented to provide a thorough understanding of the present disclosure, it shall be understood that many of the following details can be modified, varied, and components substituted without departing from the scope of the present application.

Figure 1A:
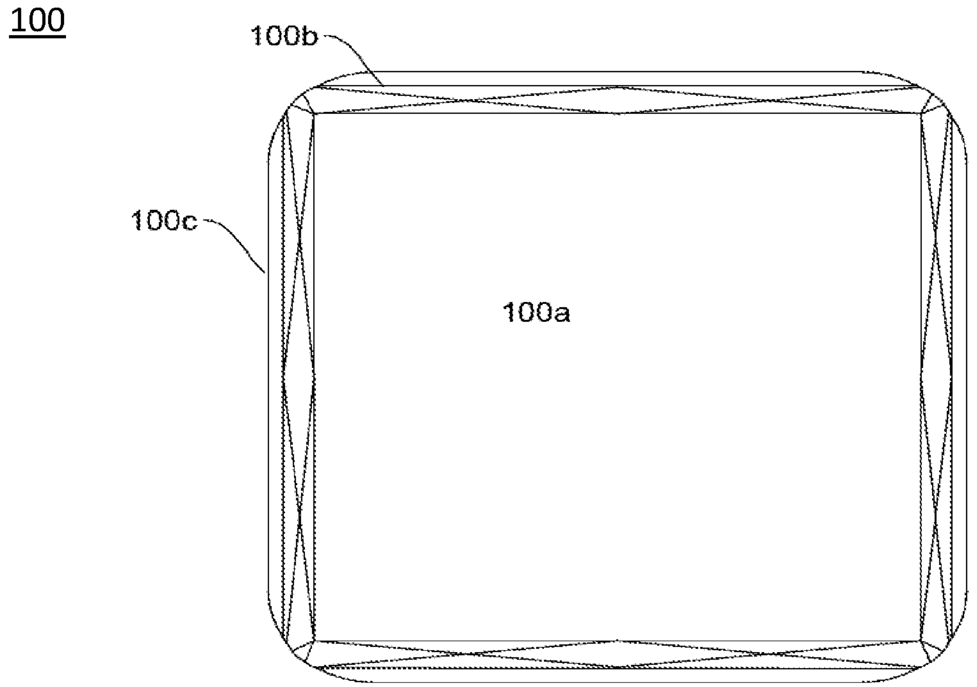
FIGS. 1A and 1B are block diagrams of a diamond gemstone.
Figure 1B:
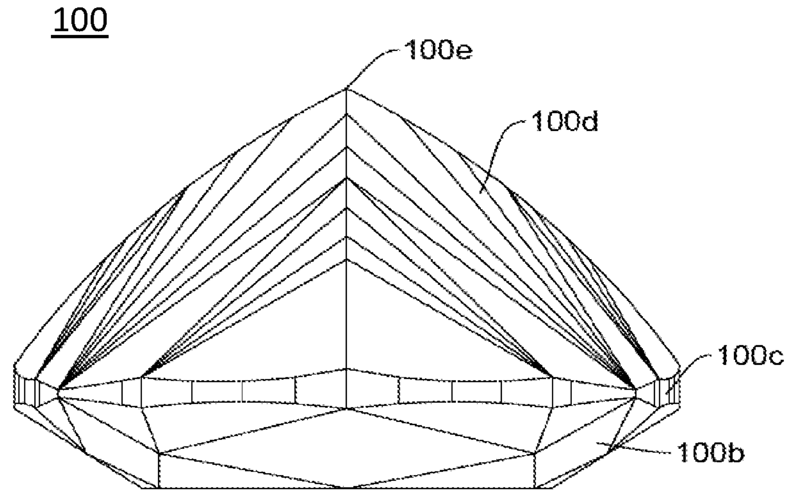

Referring to FIGS. 1A and 1B, there is a block diagram of a top view and side view of a diamond 100. The diamond 100 can include a table 100*a*, a crown 100*b*, a girdle 100*c*, a pavilion 100*d*, and culet 100*e*. Although diamonds 100 are measured by weight (1 karat=200 mg), large diamonds are perceived to have large tables 100*a* and crowns 100*b*.

In some embodiments, diamond 100 can have a cushion cut. Cushion cut refers to a generally rectangular shape with rounded corners. For purposes of this document, it shall be understood that a square is a specific type of rectangle. Thus, the term "rectangle" shall refer to a category of shapes that includes squares.

While the pavilion 100*d* of a large diamond is also large, the pavilion 100*d* is not as perceivable as the table 100*a*, crown 100*b*, and girdle 100*c*. Diamonds are typically set in jewelry so that the table 100*a* and crown 100*b* are at the top. As a result, the top view of the diamond 100 (FIG. 1A) is the most common view that the diamonds are observed and the table 100*a* and crown 100*b* are the most noticed parts. Most setting options actually obscure the pavilion 100*d* and culet 100*e*.

The appearance of a large diamond can be achieved if multiple diamonds are set together. If from the top view, the multiple diamonds are perceived as similar to top view in FIG. 1A, the multiple stones will have the appearance of a single large diamond 100. Since the cost of diamonds is non-linear, the price of the multiple diamonds will be much less. Moreover, the combined weight of the multiple diamonds will be less than the single large diamond 100.

Accordingly, the present application will now describe a method for cutting, and setting, four Princess Cut Diamonds to have the appearance of a diamond with a large crown and table. The method includes cutting to increase the size of the table if the table is not large enough (FIG. 2). With a large enough table, cuts are then made to the diamond parallel to the girdle facets (FIGS. 3 and 4). The diamond is then cut to reposition the culet (FIGS. 5A-5F). In some embodiments, a corner can be rounded for providing a cushion cut. Four of the diamonds cut according to the foregoing method can be positioned to have the appearance of the table and crown of a large diamond 100 (FIG. 6A-6C).

Figure 2A:
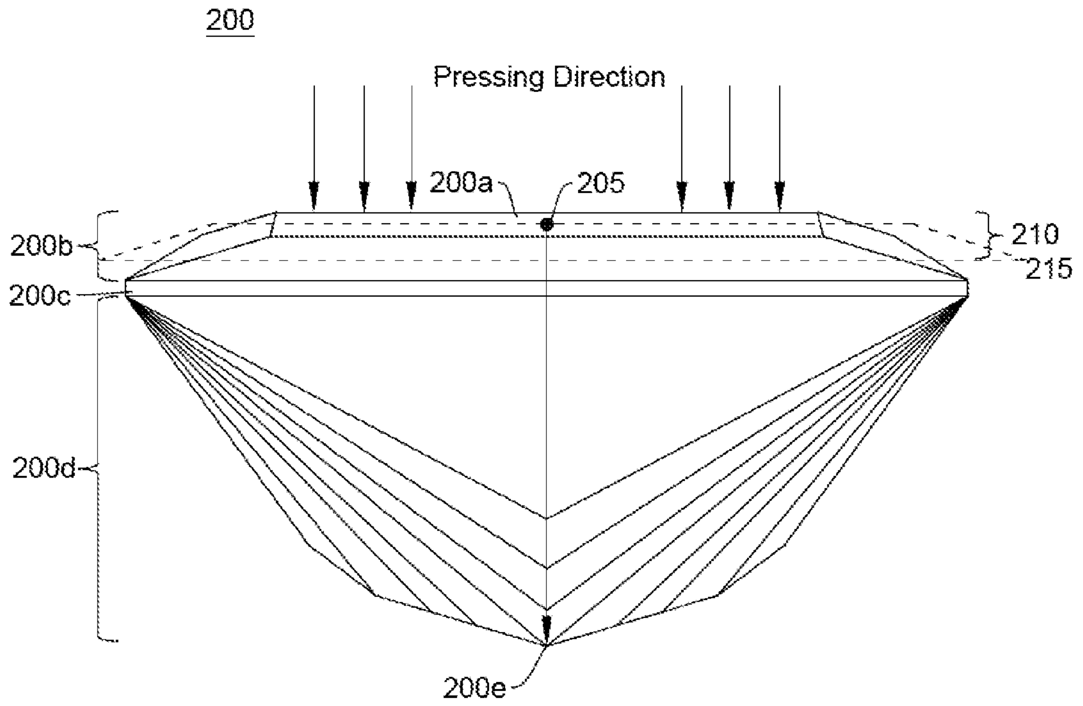
FIGS. 2A and 2B are block diagrams describing increasing the table of a princess cut diamond from the side and top view.
Figure 2B:
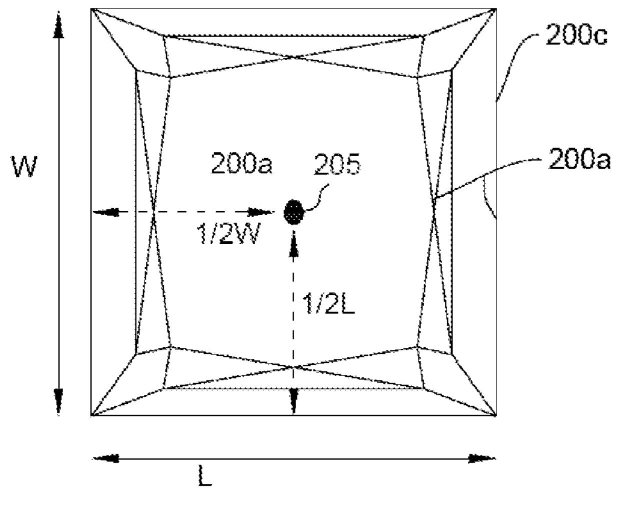

Referring now to FIG. 2, there is shown a block diagram for cutting an example of a Princess Cut Diamond 200 (FIG. 2A is a side view, FIG. 2B is a top view). The diamond 200 in FIG. 2 is one example of a Princess Cut Diamond. The qualities of diamond 200 are only presented for example, and do not apply to all Princess Cut Diamonds, as defined by standards of the Gemological Institute of America (GIA). The diamond 200 includes a table 200*a*, crown 200*b*, girdle 200*c*, pavilion 200*d*, and culet 200*e*.

The girdle 200*c* defines a rectangle parallel to the plane of the table having a length L and a width W. The length and the width are in perpendicular dimensions, and by convention, the length L is the longer dimension and the width W is the shorter dimension. The center 205 of the girdle is a point at the intersection of a line that is ½ the width W and ½ the length L of the girdle. A line orthogonal to the plane of the table through the center 205 of the girdle either passes through or deviates within 1% of the height H and width W, or within (0.01 H, 0.01 W) of the culet (now referred to as 1% deviation).

The table 200*a* size of diamond 200 is 65%. In certain embodiments, where the table size is less than 75% (or alternatively 80%), the diamond 200 is cut by a pressing force in directions orthogonal to a plane of the table 200*a*. As a result of cutting, region 210 is removed, resulting in a cut along plane 215. In certain embodiments, plane 215 is parallel, substantially parallel, or within one degree of parallel to the plane defined by the base of the girdle 200*c*. The foregoing results in a larger table. In certain embodiments, the table is larger than 75%.

It is noted that diamond cuts can be made in a number of different ways such as by laser along the cut direction or by grinding in a sanding motion by pressing in a direction orthogonal to the cut direction. The term "cutting in a direction" or "making a cut in a direction" shall refer to the resultant cut.

Figure 3A:
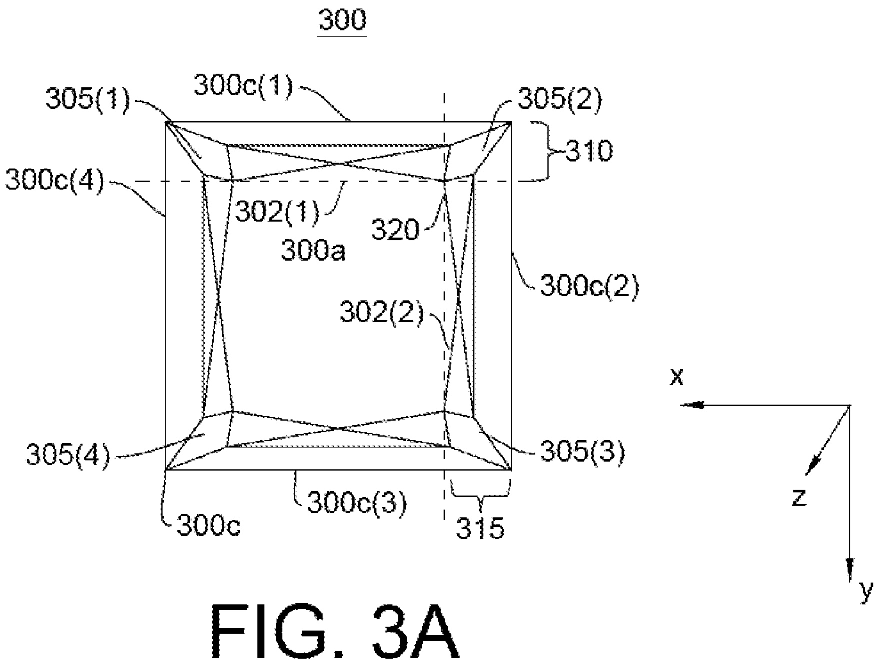
FIGS. 3A and 3B are top views.
Figure 3B:
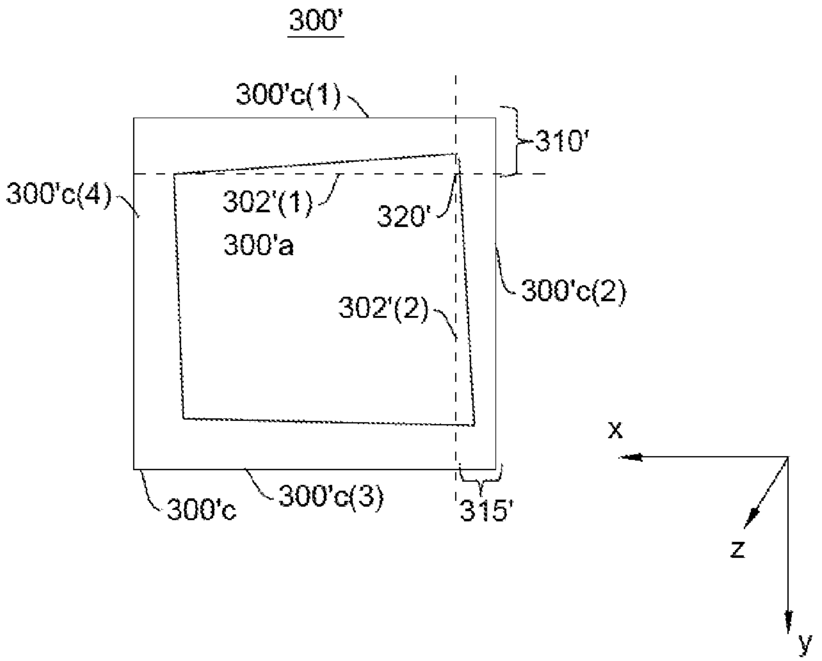

Referring now to FIGS. 3A and 3B, there are illustrated block diagrams of diamonds 300, 300' with table sizes 300*a* that are at least 75%. FIG. 3A is a princess cut diamond 300' from the top view and FIG. 3B is a modified diamond 300" with the table 300'*a'* size increased to at least 75%.

The girdles 300*c* and 300'*c* are substantially rectangular when viewed from the top view, having first facets 300*c*(1), 300'*c*(1), second facets 300*c*(2), 300'(*c*)(2), third facets 300*c*(3), 300'*c*(3), and fourth facets 300*c*(4), 300'*c*(4). The first facets 300*c*(1), 300'*c*(1), are perpendicular, substantially perpendicular, or within 1 degree of perpendicular from second facets 300*c*(2), 300'(*c*)(2), which are perpendicular, substantially perpendicular, or within 1 degree of perpendicular from third facets 300*c*(3), 300'*c*(3), which are perpendicular, substantially perpendicular, or within 1 degree of perpendicular from fourth facets 300*c*(4), 300'*c*(4).

The diamonds 300, 300' are then cut by pressing against facets 300*c*(1), 300'*c*(1) of the girdles, resulting in cuts along the dotted lines 302(1), 302'(1), and cut by pressing against facets 300*c*(2), 300'*c*(2), resulting in cuts along the dotted lines 302(2), 302'(2). Lines 302(1), 302'(1) and 302(2), 302'(2) intersect and are perpendicular, substantially perpendicular, or within one degree of perpendicular (89 to 91 degrees).

In certain embodiments, lines 302(1), 302(2), 302'(1), and 302'(2) are selected to intersect at point 320, 320'. The point 320, 320' is a point in the table 300*a*, 300'*a*, to maximize the distance to the crown in any direction below line 302(1), 302'(1), and to the left of line 302(2), 302'(2).

In certain embodiments, where the table of the Princess Cut Diamond table 300*a* exceeds 75%, or where the table of the Princess Cut Diamond table was not increased as in FIG. 2, diamond 300 includes corner facets 305(1), 305(2), 305 (3), and 305(4). Line 302(1) is through the innermost tip of facets 305(1) and 305(2). Line 302(2) is through the innermost tip of facets 305(2) and 305(3).

As a result of pressing against girdle facets 300(*c*)(1) and 300'(*c*)(1) until lines 302(1), 302'(1), sections 310, 310' are removed, facets 300*c*(2), 300'*c*(2) are shortened, facets 300*c*(4), 300*c*'(4) are shortened, and a first new girdle facet is created along line 302(1), 302'(1). As a result of pressing against girdle facets 300(*c*)(2) and 300'(*c*)(2) until lines 302(2), 302'(2), sections 315, 315' are removed, facet 300*c* (3), 300'*c*(3) and the first new girdle facets along lines 302(1), 302'(1) (to point 320, 320'), and a second new girdle facet is created along line 302(2), 302'(2).

Figure 3C:
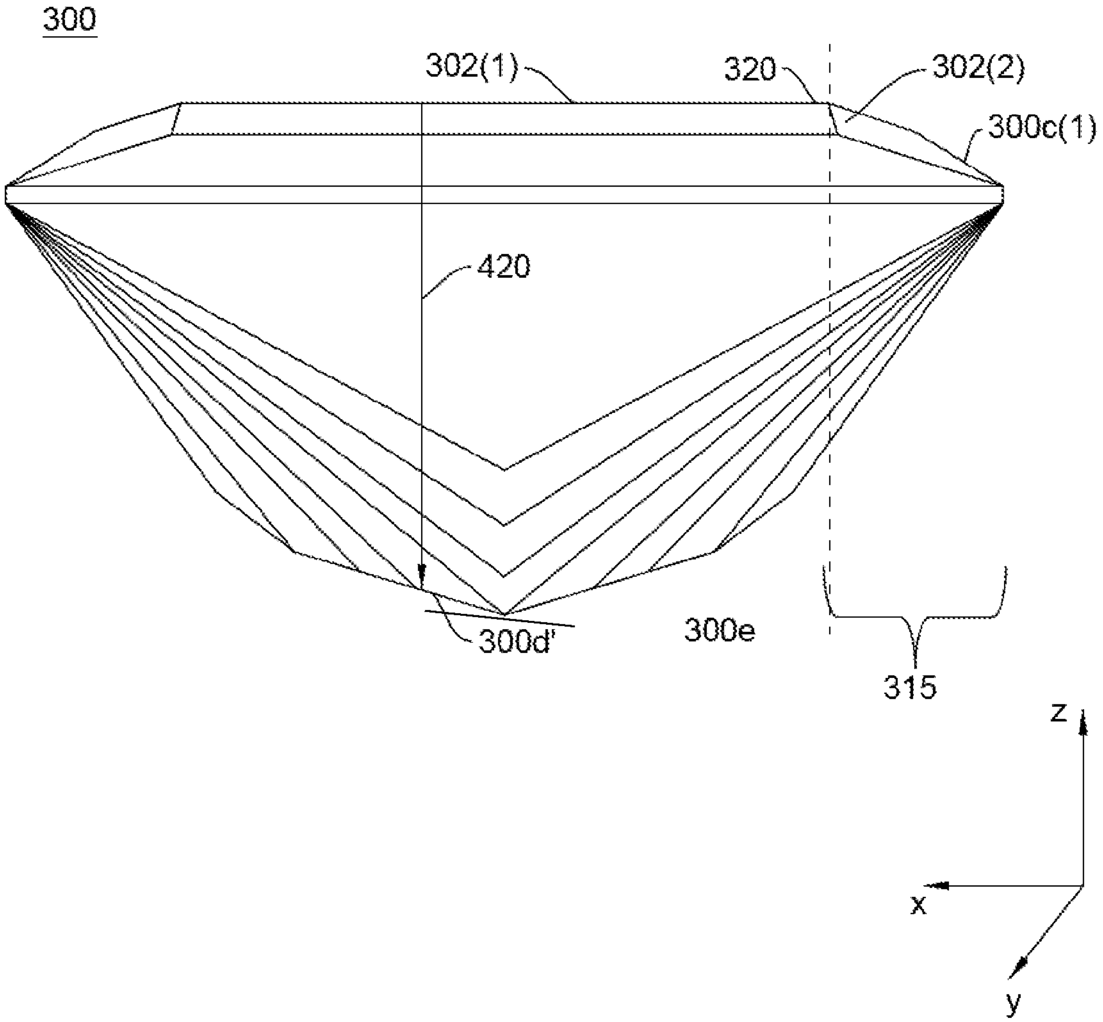
FIG. 3C is a side view describing removing portions of the crown.

FIG. 3C shows a side view of diamond 300. For example, by pressing against girdle side 300*c*(2) until line 302(2), section 315 is removed. As can be seen, the girdle is modified and reduced, and portions of the crown and pavilion are removed.

Figure 4A:
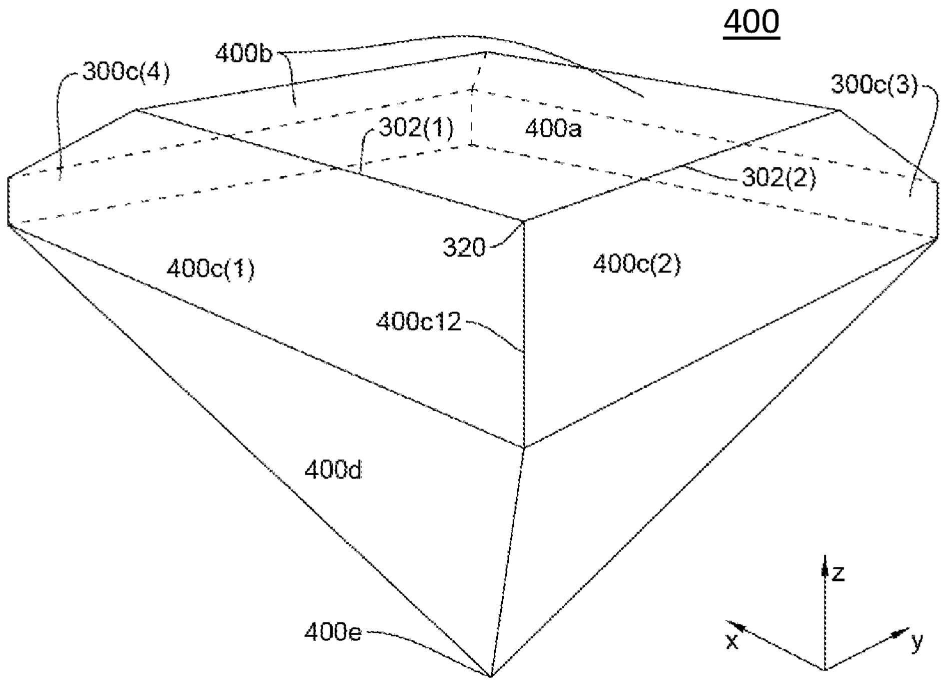
FIGS. 4A and 4B are side and top views of a diamond with the culet off-center.
Figure 4B:
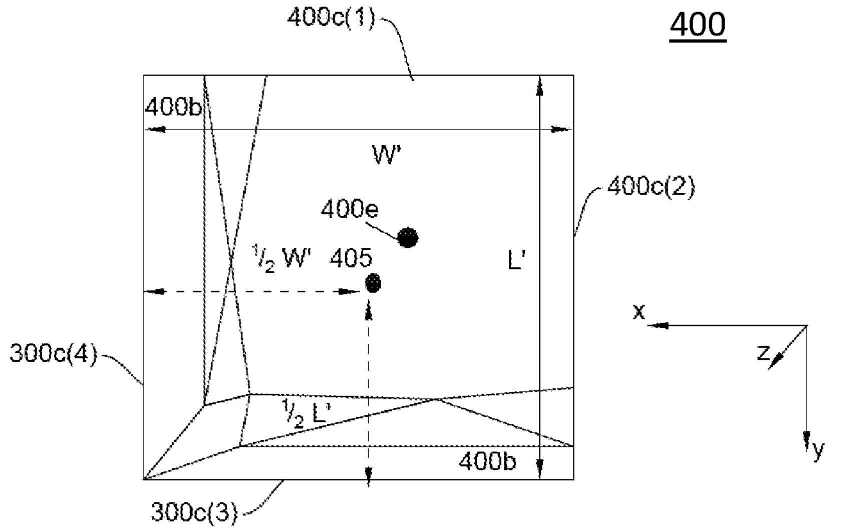

Referring now to FIGS. 4A and 4B, there is illustrated a block diagram describing a corner view and top view of the diamond 300 cut as described in FIG. 3. In the interests of brevity, the result of cutting diamond 300 will be described, as the following description is also applicable to the result of cutting diamond 300'. Moreover, a number of the facets in the pavilion 400*d* are not shown to emphasize certain other features.

The cut along line 302(1) is perpendicular, substantially perpendicular, or within 1 degree of perpendicular to the table. As a result of the cut along line 302(1), the girdle is modified, resulting in shortening girdle facets 400*c*(2) and 300*c*(4), a first new girdle facet 400*c*(1). Girdle facet 400*c* (1) is directly connected to the table 400*a* along line 302(1).

A cut along line 302(2) is perpendicular, substantially perpendicular, or within 1 degree of perpendicular to the table 400*a*. As a result of the cut along line 302(2), the girdle is modified, shortening facet 300*c*(4) and first new girdle facet 400*c*(1), and resulting in a second new girdle side 400*c*(2). Girdle facet 400*c*(2) is directly connected to the table 400*a* along line 302(2). The new girdle sides 400*c*(1) and 400*c*(2) form a 90 degree angle, a substantially a 90 degree angle, or between an 89 to 91 degree angle, along a line 400*c*12 through point 320 and orthogonal, substantially orthogonal, or within 1 degree of orthogonal to the table 400*a*. Girdle facets 400*c*(1) and 400*c*(2) have varying sizes in the z dimension that are larger than girdle facets 300*c*(3) and 300*c*(4). Girdle facets 300*c*(3) and 300*c*(4) are connected to crown 400*b* that is connected to the table 400*a*.

FIG. 4B is a top view. The rectangular shape formed by girdle facets 400*c*(1), 400*c*(2), 300*c*(3), and 300*c*(4) has a length L' and a width W'. Point 405 is located at ½ L' and ½ W'. However, the culet 400*e* was positioned at half the length ½ L and half the width ½ W. As a result of removing sections 310 and 315, the culet 400*e* deviates considerably from directly below ½ L' and ½ W'.

Placing four diamonds 400 so that table sides 302(1) and 302(2) abut each other in a 2×2 arrangement would result in the appearance of a single, larger table. However, to improve the light refractive properties, the diamond 400 is further cut so that the culet is repositioned directly below point 405. For example, returning to FIG. 3C, note that along the x direction, culet 300*e* is in the center before removal of section 315. However, after removal of 315, the center 420 in the x dimension is at another part of the pavilion 300*d'*. As a result, diamond 400 is cut so that a culet will be positioned along 420. In certain embodiments, the culet is positioned at a lower depth than pavilion portion 300*d'*.

Additionally, the crowns 400*b* may not be consistent. Accordingly, diamond 400 is further cut to create a repeatable crown 400*b*. In certain embodiments, additional cuts are made so that the diamond 400 can form part of a multi-diamond set having a Cushion Cut appearance.

FIGS. 5A-5F illustrates the resultant diamond 500. The resultant diamond 500 has 55 facets, 1-55. The table below gives the angle, angle variance, and azimuth of each facet. Each of the azimuth angles can vary by 5 degrees.

| Facet # | Angle | Angle Range (+/−) | Azimuth |
|---|---|---|---|
| Pavillion | | | |
| 1 | 39.25 | 0.75 | 225 |
| 2 | 39.25 | 0.75 | 135 |
| 3 | 39.25 | 0.75 | 45 |
| 4 | 39.25 | 0.75 | 315 |
| 5 | 41 | 1 | 257.88 |
| 6 | 41 | 1 | 192.12 |
| 7 | 41 | 1 | 167.88 |
| 8 | 41 | 1 | 102.12 |
| 9 | 41 | 1 | 77.88 |
| 10 | 41 | 1 | 12.12 |
| 11 | 41 | 1 | 347.88 |
| 12 | 41 | 1 | 282.12 |
| 13 | 43 | 1 | 257.92 |
| 14 | 43 | 1 | 192.08 |
| 15 | 43 | 1 | 167.92 |
| 16 | 43 | 1 | 102.08 |
| 17 | 43 | 1 | 77.92 |
| 18 | 43 | 1 | 12.08 |
| 19 | 43 | 1 | 347.92 |
| 20 | 43 | 1 | 282.08 |
| 21 | 46.5 | 1.5 | 258.09 |
| 22 | 46.5 | 1.5 | 191.91 |
| 23 | 46.5 | 1.5 | 168.09 |
| 24 | 46.5 | 1.5 | 101.91 |
| 25 | 46.5 | 1.5 | 78.09 |
| 26 | 46.5 | 1.5 | 11.91 |
| 27 | 46.5 | 1.5 | 348.09 |
| 28 | 46.5 | 1.5 | 281.91 |
| 29 | 57.5 | 2.5 | 270 |
| 30 | 57.5 | 2.5 | 180 |
| 31 | 57.5 | 2.5 | 90 |
| 32 | 57.5 | 2.5 | 360 |
| Girdle | | | |
| 33 | 90 | 1 | 270 |
| 34 | 90 | 1 | 275 |
| 35 | 90 | 1 | 285 |
| 36 | 90 | 1 | 295 |
| 37 | 90 | 1 | 305 |
| 38 | 90 | 1 | 325 |
| 39 | 90 | 1 | 335 |
| 40 | 90 | 1 | 345 |
| 41 | 90 | 1 | 355 |
| 42 | 90 | 1 | 360 |
| 43 | 90 | 1 | 90 |
| 44 | 90 | 1 | 180 |
| Crown | | | |
| 45 | 43 | 3 | 270 |
| 46 | 43 | 3 | 360 |
| 47 | 38 | 3 | 270 |
| 48 | 38 | 3 | 360 |
| 49 | 31.5 | 3.5 | 268.31 |
| 50 | 31.5 | 3.5 | 271.74 |
| 51 | 31.5 | 3.5 | 358.29 |
| 52 | 31.5 | 3.5 | 1.71 |
| 53 | 25 | 3 | 270 |
| 54 | 25 | 3 | 360 |
| Table | | | |
| 55 | 0 | 1 | 360 |

The process of cutting the diamond from FIG. 2 to the foregoing cuts results in a loss of only between 17 and 22 percent of the diamond mass.

Figure 5A:
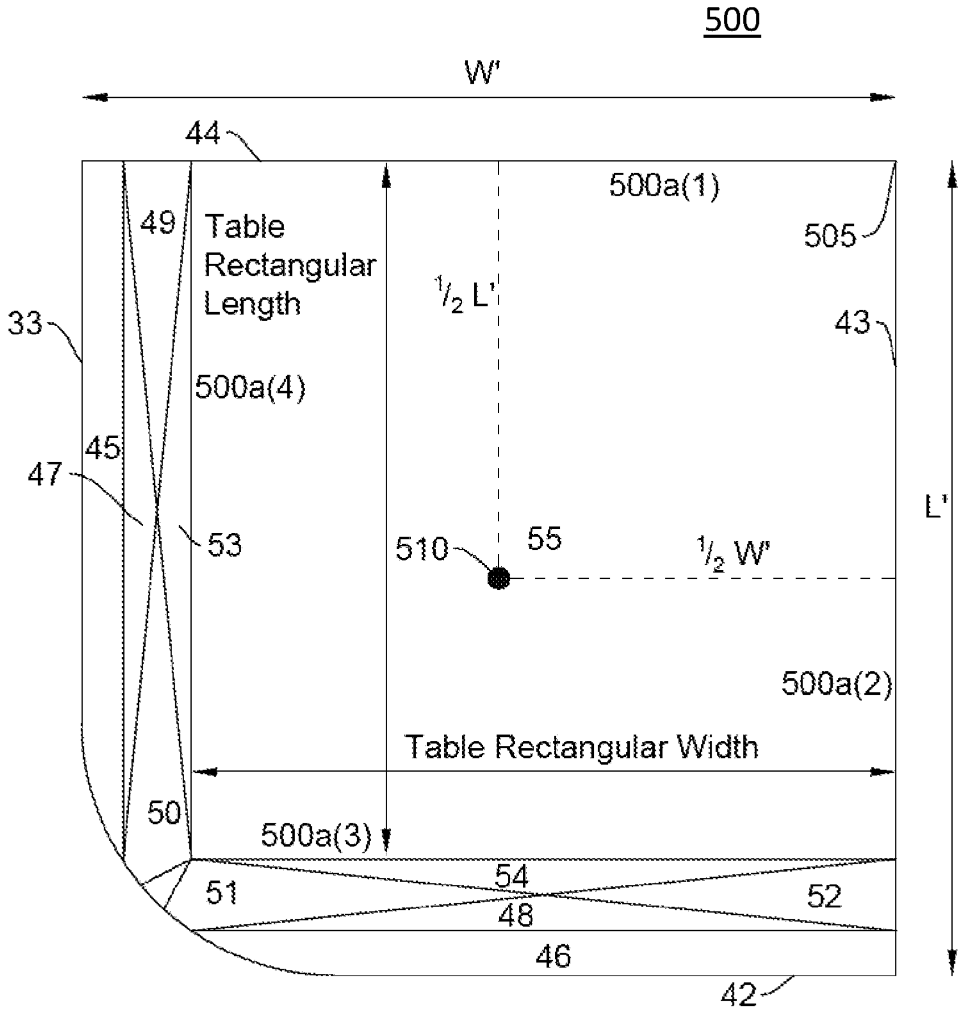
FIGS. 5A, 5B, 5C, 5D, 5E, and 5F are the top view, side views, and bottom views of a diamond with a table directly connected to the girdle, and the culet repositioned.
Figure 5B:
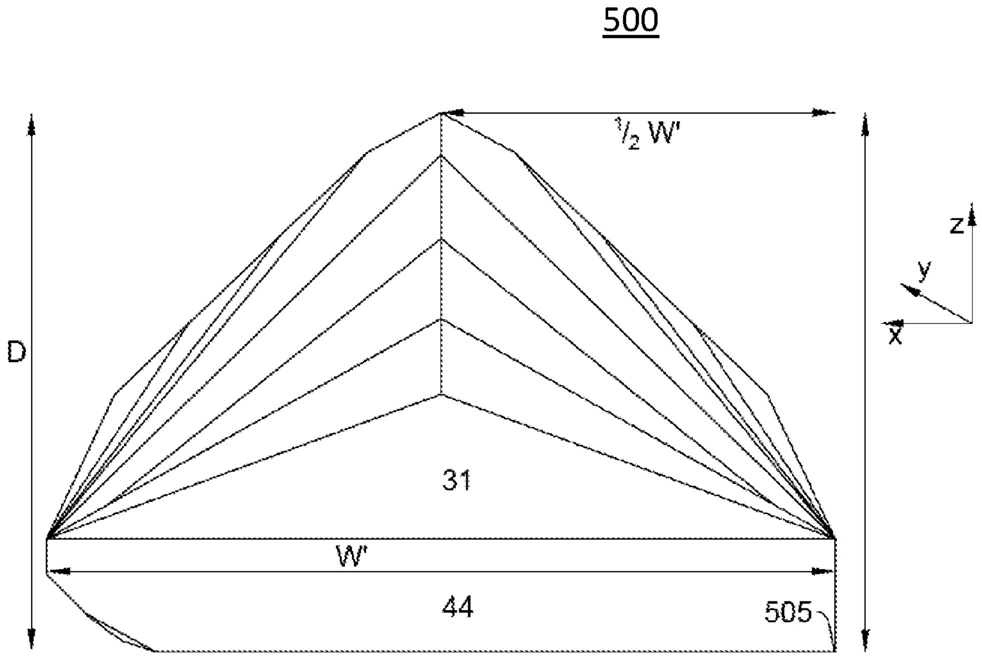
Figure 5C:
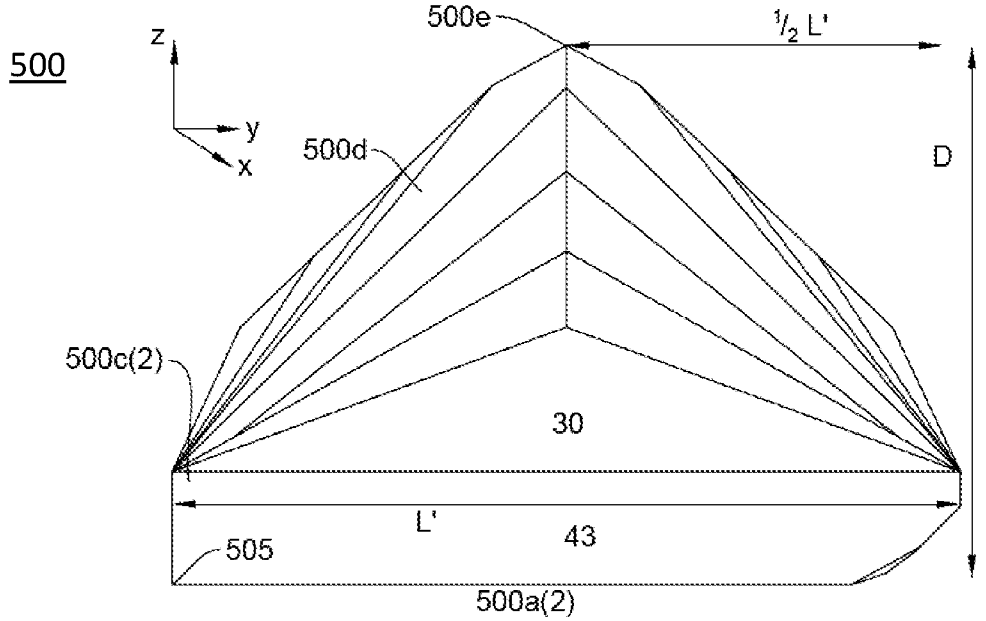
Figure 5D:
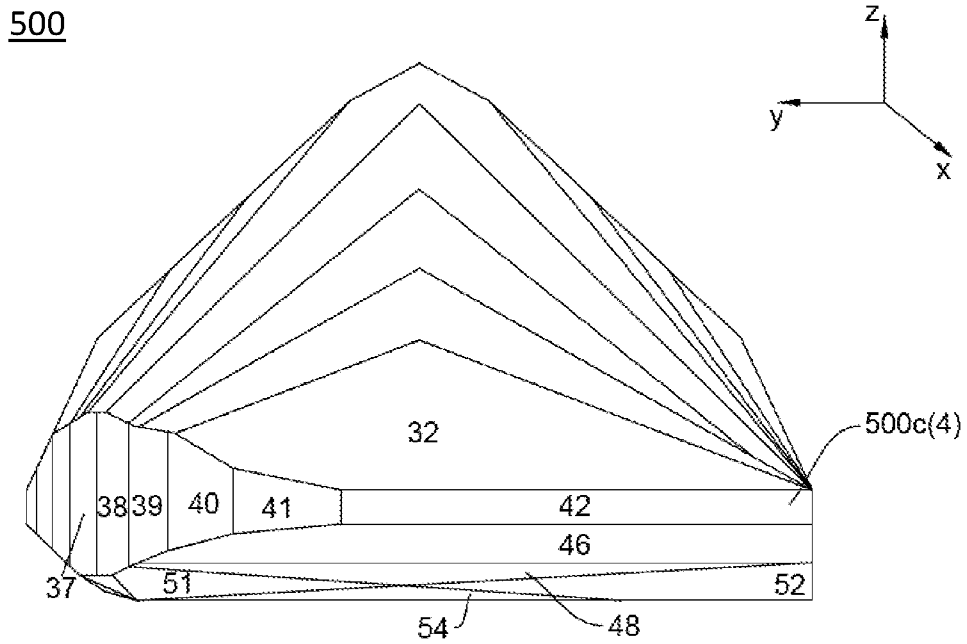
Figure 5E:
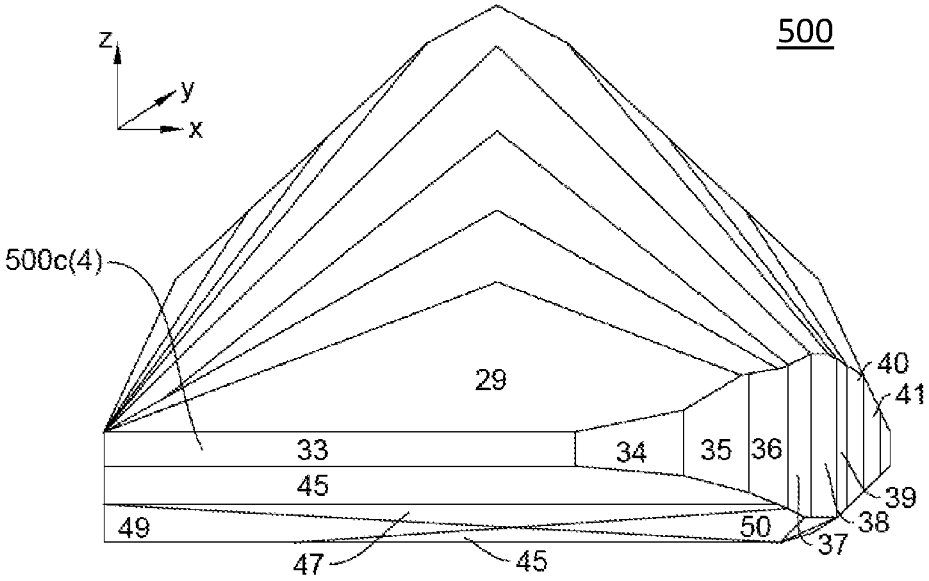
Figure 5F:
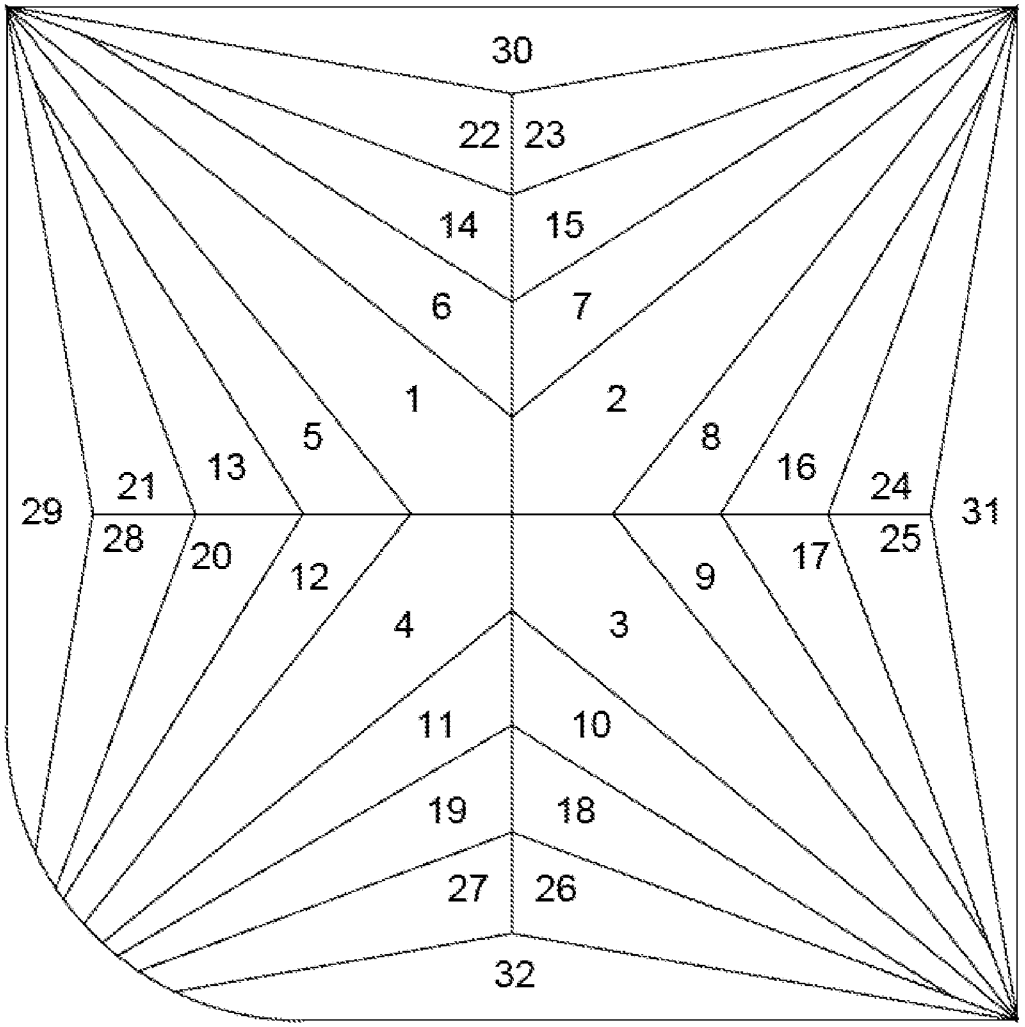
Figure 6A:
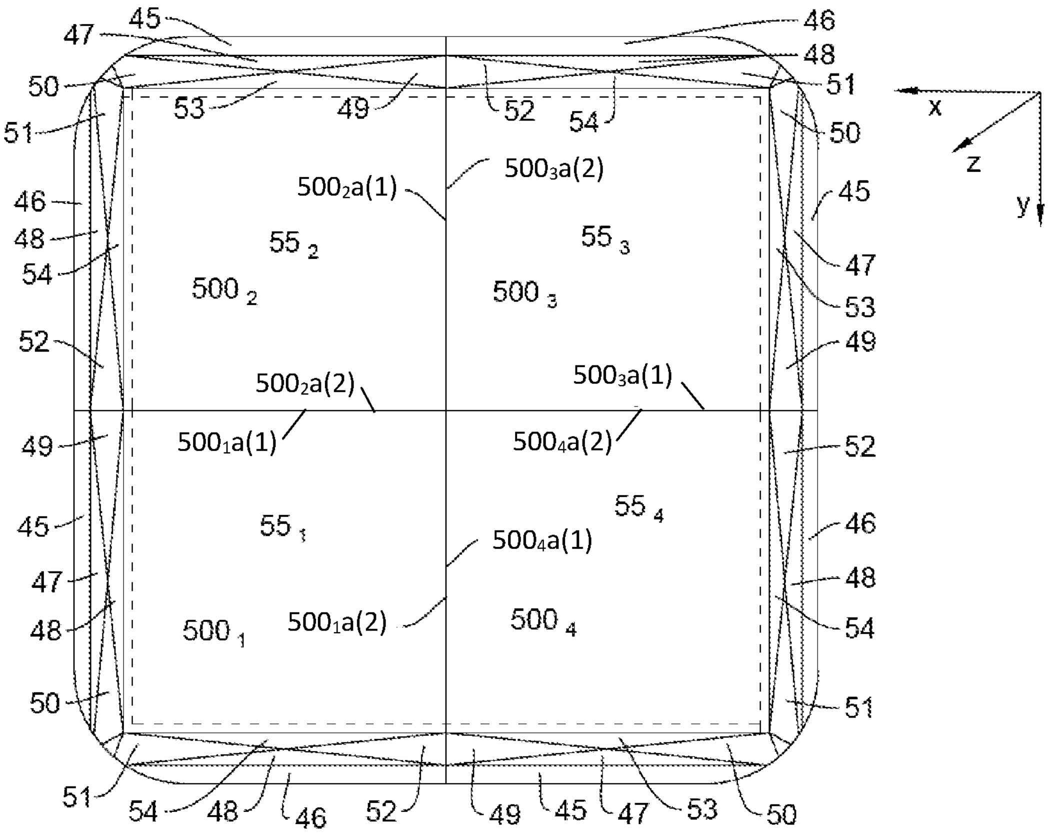
FIGS. 6A, 6B, and 6C are top, side, and bottom views of a multi-diamond sets.
Figure 6B:
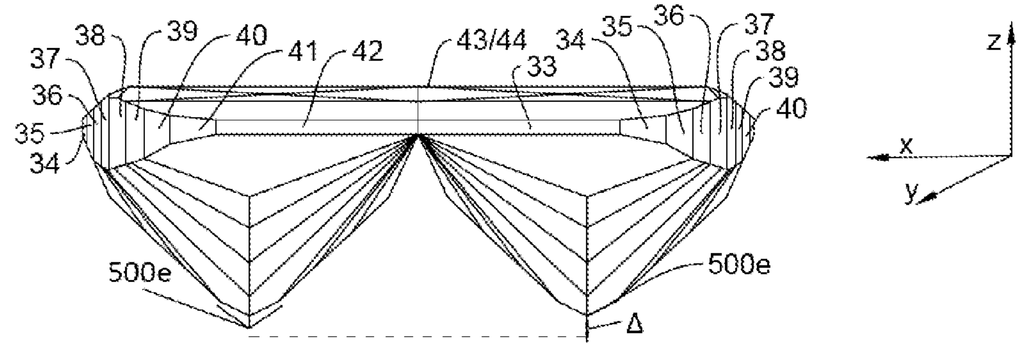
Figure 6C:
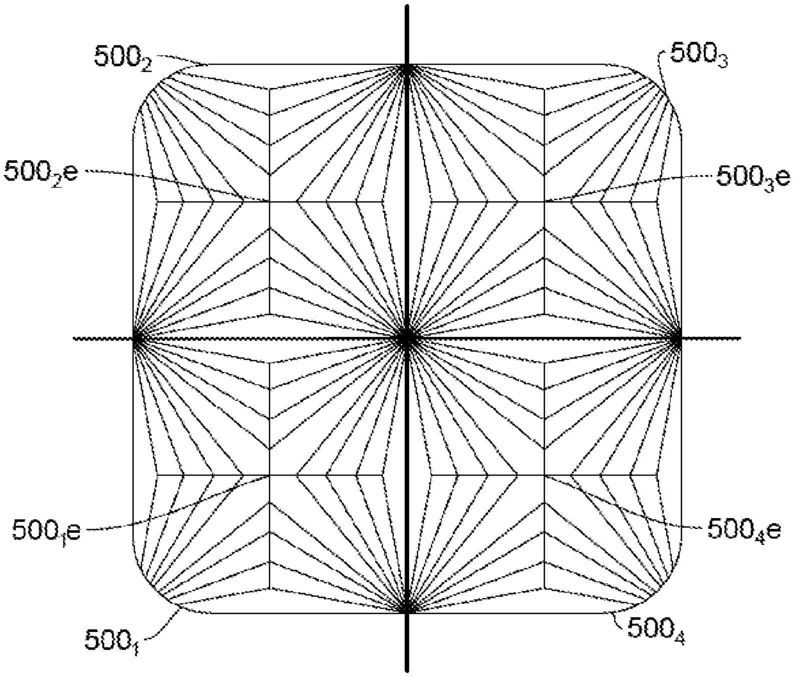

FIG. 5A is the top view, FIG. 5B-5E are side views of diamond 500, and FIG. 5F is the bottom view of diamond 500. The diamond 500 comprises a table 55, crown (comprising facets 45-54), girdle (facets 33-44), pavilion (facets 1-32), and culet 500*e*.

In certain embodiments, the table 55 is rectangular having a length and a width. Although length is shown in the vertical dimension and width is shown in the horizontal dimension, it is noted that by convention, length refers to the longer dimension and width refers to the shorter dimension. In certain embodiments, the horizontal dimension can be larger, thereby making the horizontal dimension the width. In certain embodiments, the length to width ratio can be between 1.00 to 1.03. The table 55 has a first side 500*a*(1), second side 500*a*(2), third side 500*a*(3), and fourth side 500*a*(4).

The sides of the table 500*a*(1)-500*a*(4) make a rectangular shape. Side 500*a*(1) and side 500*a*(2) are perpendicular, or substantially perpendicular, or make an angle between 89 degrees and 91 degrees. Side 500*a*(2) and side 500*a*(3) are perpendicular, or substantially perpendicular, or make an angle between 89 degrees and 91 degrees. Side 500*a*(3) and side 500*a*(4) are perpendicular, or substantially perpendicular, or make an angle between 89 degrees and 91 degrees. Side 500*a*(4) and side 500*a*(1) are perpendicular, or substantially perpendicular, or make an angle between 89 degrees and 91 degrees.

The girdle is shown in FIGS. 5B-5E and includes facets 33, 42, 43, and 44. In certain embodiments, the girdle can also include curving facets 34-41 (see FIGS. 5D and 5E). Facets 44 (see FIG. 5B) and 43 (see FIG. 5C) are perpendicular to each other, substantially perpendicular to each other, or form an angle between 89 to 91 degrees. Facets 42 (see FIG. 5D) and facets 43 (see FIG. 5E) are perpendicular to each other, substantially perpendicular to each other, or form an angle between 89 to 91 degrees. Facets 33 and 44 are perpendicular to each other, substantially perpendicular to each other, or form an angle between 89 to 91 degrees. In certain embodiments, facets 33 and 42 can be joined by curving facets 34-41. Curving facets 34-41 round a corner. In a multi-diamond set, curving facets 43-41 form the rounded corner, resulting in a cushion cut.

In FIGS. 5A and 5B, facet 44 extends completely across in the x dimension and has measurement of W'. In FIGS. 5A and C, facet 43 extends completely across in the y dimension and has a measurement of L'. The facets 33-44 of the girdle form a closed loop, although the facets are not of uniform width. For example, facets 43 and 44 are wider in certain regions and narrower in other regions.

Table 55 is directly connected at table side 500*a*(1) to girdle facet 44 (see FIG. 5B), such that table 55 is parallel, substantially parallel, or within 1 degree of parallel to the xy plane, while girdle facet 44 is parallel, substantially parallel, or within 1 degree parallel of the xz plane, thereby making table side 500*a*(1) and girdle facet 44 perpendicular, substantially perpendicular, or forming an angle between 89 to 91 degrees.

Table Side 500*a*(2) is directly connected to girdle facet 43 (see FIG. 5C). Girdle facet 43 is parallel, substantially parallel, or within 1 degree parallel of the yz plane, thereby making table side 500*a*(2) and girdle facet 44 perpendicular, substantially perpendicular, or forming an angle between 89 to 91 degrees. Moreover, at point 505, table 55, facet 44, and facet 43 contact each other, such that each of the table 55, facet 44, and facet 43 are perpendicular, substantially perpendicular, or forming an angle between 89 to 91 degrees with the others.

Referring to FIGS. 5A and 5D, table side 500*a*(3) is connected to facet 42 by crown facets 51, 54, 52, 48, and 46. Referring to FIGS. 5A and E, table side 500*a*(4) is connected to facet 33 by crown facets 45, 49, 47, 50, and 53.

As noted above, facet 44 has a measurement of W', while facet 43 has a measurement of L'. FIGS. 5A and 5F show a top and bottom view. Point 510 is positioned at ½ W' and ½ L' from point 505. The culet 500*e* is positioned such that a line passing through point 510 and orthogonal to table 55 either passes through culet 500*e* or comes within 1% deviation (0.01 W', 0.01 L').

Referring now to FIGS. 5B to 5E, the depth is defined as the distance from the culet to the table D as a percentage of the longer of L' and W'. In certain embodiments, the culet 500*e* has a depth of 70% to 90%. In other embodiments, the culet 500*e* has a depth of 70% to 80%.

Four diamonds 500 can be disposed adjacently to each other such that the tables 55 of each to give the appearance of larger diamond as described in FIG. 1.

Referring now to FIG. 6, there is illustrated a top view FIG. 6A, a side view, FIG. 6B, and a bottom view FIG. 6C of a multi-diamond setting 600 having the appearance of a single large homogeneous stone. Multi-diamond setting 600 comprises four diamonds $\mathbf{500}_1$, $\mathbf{500}_2$, $\mathbf{500}_3$, $\mathbf{500}_4$. It is noted that where the length to width ratio is close to 1, the diamond $\mathbf{500}_2$ is diamond $\mathbf{500}_1$ turned 90 degrees clockwise. Diamond $\mathbf{500}_3$ is diamond $\mathbf{500}_1$ turned 180 degrees. Diamond $\mathbf{500}_4$ is diamond $\mathbf{500}_1$ turned 90 degrees counterclockwise. In certain embodiments, the multi-diamond setting can have the appearance of having a cushion cut.

Diamonds $\mathbf{500}_1$ and $\mathbf{500}_2$ are disposed such that table side $\mathbf{500}_1a(\mathbf{1})$ is adjacent with table $\mathbf{500}_2a(\mathbf{2})$. This can be achieved by forcing facet 44 of diamond $\mathbf{500}_1$ against facet 43 of diamond $\mathbf{500}_2$. Furthermore, crown facets 49 and 45 of diamond $\mathbf{500}_1$ are adjacent to facets 52 and 46 of diamond $\mathbf{500}_2$. The foregoing can be accomplished in a number of ways. In one embodiment, metal prongs can apply lateral force against the crowns of each diamond $\mathbf{500}_1$, $\mathbf{500}_2$, $\mathbf{500}_3$, $\mathbf{500}_4$ pushing inwards. In another embodiment, and adhesive can be disposed along facets 43 and 44 of diamonds $\mathbf{500}_1$, $\mathbf{500}_2$, $\mathbf{500}_3$, $\mathbf{500}_4$.

Diamonds $\mathbf{500}_2$ and $\mathbf{500}_3$ are disposed such that table side $\mathbf{500}_2a(\mathbf{1})$ is adjacent with table $\mathbf{500}_3a(\mathbf{2})$. Furthermore, crown facets 49 and 45 of diamond $\mathbf{500}_2$ are adjacent to facets 52 and 46 of diamond $\mathbf{500}_3$. This can be achieved by forcing facet 44 of diamond $\mathbf{500}_2$ against facet 43 of diamond $\mathbf{500}_3$.

Diamonds $\mathbf{500}_3$ and $\mathbf{500}_4$ are disposed such that table side $\mathbf{500}_3a(\mathbf{1})$ is adjacent with table $\mathbf{500}_4a(\mathbf{2})$. Furthermore, crown facets 49 and 45 of diamond $\mathbf{500}_3$ are adjacent to facets 52 and 46 of diamond $\mathbf{500}_4$. This can be achieved by forcing facet 44 of diamond $\mathbf{500}_3$ against facet 43 of diamond $\mathbf{500}_4$.

Diamonds $\mathbf{500}_4$ and $\mathbf{500}_1$ are disposed such that table side $\mathbf{500}_4a(\mathbf{1})$ is adjacent with table $\mathbf{500}_1a(\mathbf{2})$. Furthermore, crown facets 49 and 45 of diamond $\mathbf{500}_4$ are adjacent to facets 52 and 46 of diamond $\mathbf{500}_1$. This can be achieved by forcing facet 44 of diamond $\mathbf{500}_4$ against facet 43 of diamond $\mathbf{500}_1$.

Additionally, the tables $\mathbf{55}_1$, $\mathbf{55}_2$, $\mathbf{55}_3$, and $\mathbf{55}_4$ are substantially coplanar such that they are perceived as one single table, and wherein no crevices between edges of the individual tables are perceivable to the naked eye or by touch. Additionally, facets 45 and 46, and facets 49 and 52 of each diamond $500_1$, $500_2$, $500_3$, $500_4$ are substantially coplanar so as to appear to be single facets, wherein no crevices therebetween are visible, or perceivable by touch.

Referring now to FIG. 6B, there is illustrated a block diagram of a side view of the multidiamond set 600. From the side view, only diamonds $500_1$ and $500_4$ can be seen. Girdle facets 42 and 33 are substantially coplanar such that they are perceived as one single table, and wherein no crevices between edges of the individual tables are perceivable to the naked eye or by touch. Facets 43 and 44 are forced against each other at line 43/44. Furthermore, curving facets 34-41 can be seen. It is noted that each diamond 500 has a culet. While in certain embodiments, the culets 500*e* have the same depth, in other embodiments, the cutlets can have different depths. Since the pavilion is the least visible portion of the multi-diamond set, the differing depths of the culets is not highly observable and can be obscured by many jewelry fittings. Where the culets 500*e* have different depths, the culets are disposed higher or lower with respect to each other such that the facets 42, 33, tables, and crown facets are co-planar. For example, where the distance between the table and culet 500*e* between two diamonds 500 differ by an amount Δ, the culet 500*e* can be set at a height differential of Δ.

FIG. 6C shows a bottom view of the multi-diamond setting. Diamonds $500_1$, $500_2$, $500_3$, and $500_4$ are adjacent to each other. Unlike the diamond of FIG. 1, the multi-diamond set has four culets $500_1e$, $500_2e$, $500_3e$, $500_4e$. However, the bottom view is the least observable and can be obscured by jewelry setting.

In some embodiments, diamonds 500 and diamond setting 600 can be a non-rectangular parallelogram. Sides of the table 500*a*(1)-500*a*(4) may form a parallelogram, where sides 500*a*(1) and 500*a*(3), and sides 500*a*(2) and 500*a*(4) are parallel, substantially parallel, or within one degree of parallel. The angle formed by sides 500*a*(1) and 500*a*(2) is equal, substantially equal, or within one degree of the angle formed by sides 500*a*(3) and 500*a*(4). The angle formed by sides 500*a*(2) and 500*a*(3) is equal, substantially equal, or within one degree of the angle formed by sides 500*a*(1) and 500*a*(4). Moreover, the sum of the angles formed between sides 500*a*(1) and 500*a*(2) and sides 500*a*(2) and 500*a*(3) are 180 degrees, substantially 180 degrees, or within one degree of 180 degrees.

Facets 33, 42, 43, and 44 may form a parallelogram, but for curving facets 34-41 between facets 33 and 42. Facets 42 and 44, and facets 33 and 43 are parallel, substantially parallel, or within one degree of parallel. The angle formed by 33 and 44 is equal, substantially equal, or within one degree of the angle formed by facets 42 and 43. The angle formed by facets 43 and 44 is equal, substantially equal, or within one degree of the angle that facets 42 and 33 would intersect, but for curving facets 34-41. Moreover, the sum of the angles formed between sides 43 and 44 and facets 43 and 42 are 180 degrees, substantially 180 degrees, or within one degree of 180 degrees.

For example, in one embodiment, sides 500*a*(1) and 500*a*(2), and sides 500*a*(3) and 500*a*(4) can each form a 45 degree angle, an angle of substantially 45 degrees, or an angle within one degree of 45 degrees. Sides 500*a*(2) and 500*a*(3) and sides 500*a*(1) and 500*a*(4) can form a 135 degree angle, an angle of substantially 135 degrees, or an angle within one degree of 135 degrees. Facets 43 and 44 can form, and facets 33 and 42 can intersect, but for the curving facets 34-41, at a 45 degree angle, an angle of substantially 45 degrees, or an angle within one degree of 45 degrees. Facets 42 and 43 and facets 33 and 44 can form a 135 degree angle, an angle of substantially 135 degrees, or an angle within one degree of 135 degrees. The culet can be positioned within 1% deviation from a point directly below the midpoint of a line connecting the points where facets 42 and 43 meet, and facets 33 and 44 meet. In the foregoing embodiment, the curving facets 34-41 curve the acute (45 degree) angle In another embodiment, sides 500*a*(1) and 500*a*(2), and sides 500*a*(3) and 500*a*(4) can each form a 135 degree angle, an angle of substantially 135 degrees, or an angle within one degree of 135 degrees. Sides 500*a*(2) and 500*a*(3) and sides 500*a*(1) and 500*a*(4) can form a 45 degree angle, an angle of substantially 45 degrees, or an angle within one degree of 45 degrees. Facets 43 and 44 can form, and facets 33 and 42 can intersect, but for the curving facets 34-41, at a 135 degree angle, an angle of substantially 135 degrees, or an angle within one degree of 135 degrees. Facets 42 and 43 and facets 33 and 44 can form a 45 degree angle, an angle of substantially 45 degrees, or an angle within one degree of 45 degrees. The culet can be positioned within 1% deviation of a point directly below the midpoint of a line connecting the points where facets 42 and 43 meet and facets 33 and 44 meet. In the foregoing embodiment, the curving facets 34-41 curve the obtuse (135 degree) angle.

In one embodiment, diamond setting 600 can include two diamonds (oriented 180 degrees with respect to each other) where the curving facets curve the acute angle, and two diamonds (oriented 180 degrees with respect to each other) where the curving facets curve the obtuse angle. The foregoing four diamonds can be combined such that the curving facets are in each corner.

Accordingly, the appearance of a large diamond is achieved by the multi-diamond set by providing a very similar crown/table view. The cost is considerably cheaper because multiple diamonds are used instead of single pieces. Additionally, even the combined weight of the individual diamonds is considerably less because there is considerably less diamond material making up the pavilion. However, the position of the culets $500_1e$, $500_2e$, $500_3e$, $500_3e$ provide light refraction that is still visually pleasing.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A diamond comprising:

a table, a crown, a girdle, and pavilion, and a culet;

wherein the table is rectangular, having a length and a width, and comprises:

a first side, adjacent to a second side, the second side adjacent to a third side, and the third side adjacent to a fourth side;

wherein the first side of the table is directly connected with a first facet of the girdle;

wherein the second side of the table is directly connected with a second facet of the girdle; and wherein the crown comprises:

a plurality of facets connecting the third side and the fourth side of the table to the girdle; and wherein the pavilion is connected to the girdle; and wherein the culet is positioned directly below a point having within a 1% deviation from a center of the girdle; and wherein the girdle comprises four facets, the four facets including the first facet and the second facet, a third facet substantially orthogonal to the first facet, and a fourth facet substantially orthogonal to the second facet, and wherein the first facet is wider where the first facet and the second facet are connected than where the first facet is connected to the third facet, and the second facet is wider where the first facet and the second facet are connected than where the second facet is connected to the fourth facet, wherein the girdle further comprises a plurality of curving facets connecting the third facet to the fourth facet, wherein the plurality of curving facets comprises four curving facets.

2. The diamond of claim 1, wherein the diamond has a depth, and wherein the depth is between 70% and 80% of the width.

3. The diamond of claim 1, wherein a ratio of a length of the first side of the table and a length of a second side of the table is between 0.97 and 1.03.

* * * * *